(12) United States Patent
Wu et al.

(10) Patent No.: US 8,120,816 B2
(45) Date of Patent: Feb. 21, 2012

(54) AUTOMATED IMAGE QUALITY DIAGNOSTICS SYSTEM

(75) Inventors: Wencheng Wu, Webster, NY (US); Meera Sampath, Chennai (IN)

(73) Assignee: Xerox Corporation, Norwalk, CT (US)

( * ) Notice: Subject to any disclaimer, the term of this patent is extended or adjusted under 35 U.S.C. 154(b) by 844 days.

(21) Appl. No.: 11/170,638

(22) Filed: Jun. 30, 2005

(65) Prior Publication Data

US 2007/0003109 A1 Jan. 4, 2007

(51) Int. Cl.
*G06K 9/00* (2006.01)
(52) U.S. Cl. ........ 358/3.26; 358/504; 382/112; 382/275
(58) Field of Classification Search .................... 358/1.1, 358/1.9, 3.26, 504; 382/260–265, 275, 112
See application file for complete search history.

(56) References Cited

U.S. PATENT DOCUMENTS

| | | | |
|---|---|---|---|
| 5,204,538 A | 4/1993 | Genovese | |
| 5,732,306 A * | 3/1998 | Wilczak, Jr. | 399/9 |
| 5,884,118 A | 3/1999 | Mestha et al. | |
| 6,571,000 B1 * | 5/2003 | Rasmussen et al. | 382/112 |
| 6,597,473 B1 | 7/2003 | Tasmussen et al. | |
| 6,665,425 B1 | 12/2003 | Sampath et al. | |
| 6,682,173 B1 * | 1/2004 | Shaked et al. | 347/43 |
| 6,690,471 B2 | 2/2004 | Tandon et al. | |
| 6,842,266 B1 | 1/2005 | Farnung et al. | |
| 2003/0142985 A1 * | 7/2003 | Sampath et al. | 399/9 |
| 2005/0036705 A1 * | 2/2005 | Viassolo et al. | 382/275 |

* cited by examiner

*Primary Examiner* — King Poon
*Assistant Examiner* — Lawrence Wills
(74) *Attorney, Agent, or Firm* — Pillsbury Winthrop Shaw Pittman LLP (57) ABSTRACT

A system for activating automated image quality diagnostic systems via a direct communication from the image-based control system is disclosed. The system includes a printing engine configured to intake electronic image input and to output tangible image output based on the electronic image input, an image-based measurement system configured to make measurements of image parameters associated with the tangible image output, and an automated compensation system configured to store nominal value parametric measurements for one or more image parameters measured by the image-based measurement system and to compare the nominal value measurements to related one or more parameters measured to determine anomalies in the output tangible image system.

23 Claims, 4 Drawing Sheets

AUTOMATED IMAGE QUALITY DIAGNOSTICS SYSTEM

BACKGROUND

All references cited in this specification, and their references, are incorporated by reference herein where appropriate for teachings of additional or alternative details, features, and/or technical background.

Disclosed in the embodiments herein is an automated image diagnostics system that is activated by information extracted from an image-based control system indicative of degradation in image print quality.

In one embodiment, the present disclosure relates to electrophotographic printing. It finds particular application in conjunction with a method and system for controlling a printing device's tone reproduction curve. The invention helps to minimize the chance of degradation of image quality of final outputs by initiating an automated image quality diagnostics system via monitoring the control parameters in an image based control system. The invention will be described in reference to a xerographic print engine. However, the invention is also amenable to other electrophotographic processes, such as for example, ionographic print engines and like applications.

Electrophotographic copiers, printers and digital imaging systems typically record an electrostatic latent image on an imaging member. The latent image corresponds to the informational areas contained within a document being reproduced. In xerographic systems, a uniform charge is placed on a photoconductive member and portions of the photoconductive member are discharged by a scanning laser or other light source to create the latent image. In ionographic print engines the latent image is written to an insulating member by a beam of charge carriers, such as, for example, electrons. However it is created, the latent image is then developed by bringing a developer, including colorants, such as, for example, toner particles into contact with the latent image. The toner particles carry a charge and are attracted away from a toner supply and toward the latent image by an electrostatic field related to the latent image, thereby forming a toner image on the imaging member. The toner image is subsequently transferred to a physical media, such as a copy sheet. The copy sheet, having the toner image thereon, is then advanced to a fusing station for permanently affixing the toner image to the copy sheet.

The approach utilized for multi-color electrophotographic printing is substantially identical to the process described above. However, rather than forming a single latent image on the photoconductive surface in order to reproduce an original document, as in the case of black and white printing, multiple latent images corresponding to color separations are sequentially recorded on the photoconductive surface. Each single color electrostatic latent image is developed with toner of a color complimentary thereto and the process is repeated for differently colored images with the respective toner of complimentary color. Thereafter, each color toner image can be transferred to the copy sheet in superimposed registration with the other toner images, creating, for example, a multilayered toner image on the copy sheet. This multi-layer toner image is permanently affixed to the copy sheet in substantially conventional manner to form a finished copy.

Figure 4:
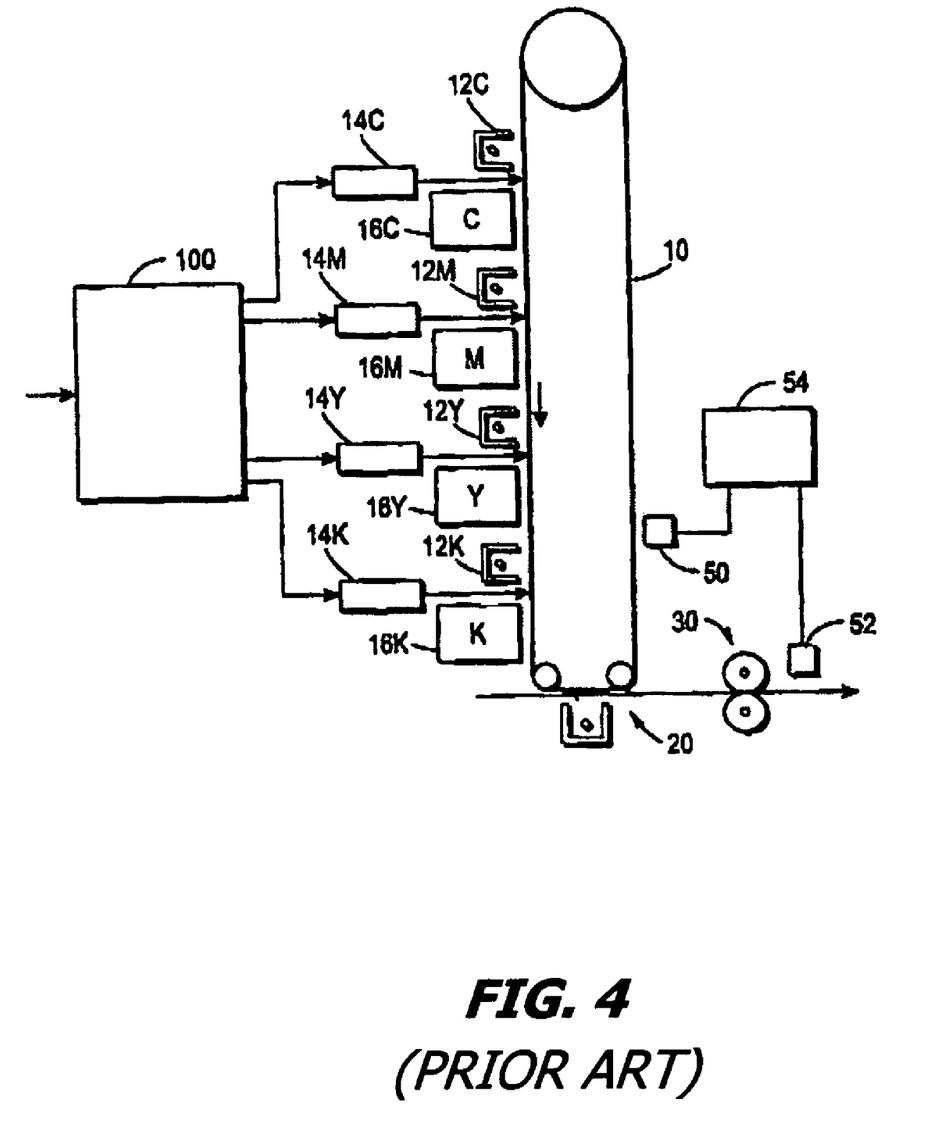
FIG. 4 (prior art) is a simplified elevational view of essential elements of a xerographic color printer.

FIG. 4 is a simplified elevational view of essential elements of a color printer, showing a context of the present invention. Specifically, there is shown an "image-on-image" xerographic color printer, in which successive primary-color images are accumulated on a photoreceptor belt, and the accumulated superimposed images are in one step directly transferred to an output sheet as a full-color image.

Specifically, the FIG. 4 embodiment includes a belt photoreceptor 10, along which are disposed a series of stations, as is generally familiar in the art of xerography, one set for each primary color to be printed. For instance, to place a cyan color separation image on photoreceptor 10, there is used a charge corotron 12C, an imaging laser 14C, and a development unit 16C. For successive color separations, there is provided equivalent elements 12M, 14M, 16M (for magenta), 12Y, 14Y, 16Y (for yellow), and 12K, 14K, 16K (for black). The successive color separations are built up in a superimposed manner on the surface of photoreceptor 10, and then the combined full-color image is transferred at transfer station 20 to an output sheet. The output sheet is then run through a fuser 30, as is familiar in xerography.

Also shown in FIG. 4 is a set of what can be generally called "monitors," such as 50 and 52, which can feed back to a control device 54. The monitors such as 50 and 52 are devices which can make measurements to images created on the photoreceptor 10 (such as monitor 50) or to images which were transferred to an output sheet (such as monitor 52). These monitors can be in the form of optical densitometers, calorimeters, electrostatic voltmeters, etc. There may be provided any number of monitors, and they may be placed anywhere in the printer as needed, not only in the locations illustrated. The information gathered therefrom is used by control device 54 in various ways to aid in the operation of the printer, whether in a real-time feedback loop, an offline calibration process, a registration system, etc.

For faster printing rates, requiring faster sheet feeding rates along paper paths, which can reach more than, for example, 100-200 pages per minute, registration systems and functions become much more difficult and expensive.

Systems that can perform image analysis on printed test samples can be used in a variety of ways to provide solutions and value to users of digital printers and copiers, for example as the analysis engine for automatic and/or remote diagnosis of print quality problems, or for monitoring image quality as part of a print quality assurance system. The image quality analysis may be used as part of a system for machine diagnostics. In such case, for example, images from a printer/copier may be scanned back by a stand-alone scanner or a scanner associated with the printer/copier, and fed into an image analysis module, which then quantifies different types of non-uniformities and use this as a basis for diagnosing machine problems. Non-uniformities include (a) amplitude modulated cluster dot halftone patterns; (b) frequency modulated halftone patterns (e.g., stochastic screens); (c) irregular two-dimensional variations from noise; (d) isolated (non-periodic) one-dimensional streaks; (e) periodic, one-dimensional bands; and (f) one- or two-dimensional periodic variations (Moire).

For example, non-uniformities in category (a) would be a result of the normal operation of the printer and not require any corrective action, while excessive non-uniformities in category (c) would be a diagnostic signal that the printer needs service. If separation between (a) and (c) is not made, the color variation caused by halftone screens could dominate the overall signal, and small but important variations caused by process noise may go undetected, resulting in ineffective diagnosis of printer/copier operation.

As far as the type of color variation is concerned, it may be variations purely in lightness (CIELab L*), or it could be variations that also include hue and chroma. Although the visual perception of such variations strongly depends on the type of color variation, the invention proposed here applies equally well to all of the above-identified types.

Amplitude modulated cluster dot halftone patterns usually have a relatively high spatial frequency (e.g., 141 lines per inch). These patterns are usually not very objectionable to a human observer. This is partly because the frequency is so high that they are not easily visible, and partly because of their regular, periodic nature. On the other hand, frequency modulated halftone patterns at the same level will be visible and highly objectionable by a human observer unless these are of high spatial frequency, because their irregular nature makes the print appear "noisy". Irregular two-dimensional variations caused by various sources of noise in the printing process can form graininess or mottle in the image. For example, in an electrophotographic system, graininess is usually found in and caused by the development subsystem, while mottle is caused by an incomplete transfer of toner to substrate. Isolated (non-periodic) one-dimensional streaks, for example, can be caused by the signature of a misdirected jet for ink-jet printing. Periodic, one-dimensional bands, for example, can be caused by motion-quality problems with paper-advance mechanisms. One- or two-dimensional periodic variations known as Moire, can be caused by the interference of higher frequency periodic variations. This can be highly notable, for example, in three or four color printing when the different screens beat against each other. These are all types of non-uniformity which are addressed by the proposed technique.

It is well known that customer satisfaction can be improved and maintenance costs reduced if problems with copiers and printers can be fixed before they become serious enough to warrant a service call by the customer. While current technology exists to enable printers and copiers to call for service automatically when sensors detect certain operating parameters outside of permissible ranges, there is not a very comprehensive manner of detecting incipient system failure or automatically diagnosing when problems with image quality reach a level where human observers perceive a reduction in quality. This is caused not only by the large number of operating parameters that would need to be tracked, but also because these parameters are strongly coupled to one another. That is, a given parameter at a certain value may or may not be a problem depending on the values of other parameters. While existing systems may provide some level of image quality analysis, these systems may be found to be less than satisfactory as image quality determination is machine dependent and may be inconsistent with perceptions of image quality as judged by human users.

REFERENCES

U.S. Pat. No. 5,204,538, commonly assigned, discloses an apparatus measures the reflectivity of a selected region of a surface. A first light beam is reflected from the selected region and substantially focused on a photodetector. A second light beam is reflected from the selected region and is substantially unfocused on the photodetector. A signal is derived representative of the direct reflectance of light reflected from the surface onto the photodetector as a function of the intensities of the focused light beam and the unfocused light beam detected by the photodetector.

U.S. Pat. No. 5,884,118, commonly assigned, discloses an imaging machine including an input scanner linked to the machine output for automated image quality improvement.

U.S. Pat. No. 6,571,000, commonly assigned, discloses a system providing one or more digital test patterns stored in memory or on disk (or stored in hard copy form) for providing one or more hard copy test images; an input scanner that can scan the hard copy test image to form a digital raster image; and an image quality analysis module that receives information about the position of the digital raster image and produces test results relevant to determination of image quality analysis as perceived by human observers, particularly color non-uniformity. The input scanner and image quality analysis module may form part of the image output device or may be stand-alone components used to test the device.

U.S. Pat. No. 6,597,473, commonly assigned, discloses an image quality analysis system for image output devices, such as printers and copiers, that overcomes problems with differences in analysis results caused by use of different image input devices. This is achieved by computing a differential transfer function that makes subsequent analysis device independent. It is asserted therein that by determining the resolving characteristics of the input scanner, the scanned image can be processed, with little or no artifacts, to resemble the image as perceived by a human observer, while at the same time eliminating differences that would arise when using a scanner having a different spatial resolving power.

U.S. Pat. No. 6,665,425, commonly assigned, discloses automated diagnosis, prediction and remediation of failures in document processing systems based on image quality defect analysis in conjunction with a machine/device data analysis. Image quality problems are detected by analyzing specific test patterns via techniques such as image processing and pattern recognition.

U.S. Pat. No. 6,690,471, commonly assigned, discloses the use of plural sensor chip imaging bars, typically used in document scanning, as spectrophotometers.

U.S. Pat. No. 6,842,266, commonly assigned, discloses an image processing system receives image input terminal information and image output terminal information. Based on the content of the image input terminal information and the image output terminal information a new system tone reproduction curve is determined. This device independent methodology allows system tone reproduction curves to be generated as needed, and allows the additional flexibility for changes in the image input terminal or the image output terminal.

SUMMARY

Aspects disclosed herein include:

an automated image-quality diagnostic system in a printing system comprising a printing engine configured to intake electronic image input and to output tangible image output based on the electronic image input; an image-based measurement system configured to make measurements of image parameters associated with the tangible image output; and an automated compensation system configured to store nominal value parametric measurements for one or more image parameters measured by the image-based measurement system and to compare the nominal value measurements to related one or more parameters measured to determine anomalies in the output tangible image system and to alter the electronic image input into the printing engine to ameliorate the determined anomalies in a subsequent tangible image output from the printing engine;

an automated image-quality diagnostic system in a printing system comprising a printing engine configured to intake electronic image input and to output tangible image output based on the electronic image input; an image-based measurement system configured to make measurements of image parameters associated with the tangible image output; an automated compensation system configured to store nominal value parametric measurements for one or more image parameters measured by the image-based measurement system and to compare the nominal value measurements to related one or more parameters measured to determine anomalies in the output tangible image system and to alter the electronic image input into the printing engine to ameliorate the determined anomalies in a subsequent tangible image output from the printing engine; and an automated image quality diagnostic system configured to obtain input from an image-based control system in communication with a print engine designed to print a tangible output image in response to an input image inputted into the print engine, and to alter the output image of the print engine based on the input from the image-based control system by altering the input image of the print engine.

BRIEF DESCRIPTION OF THE DRAWINGS

Various of the above mentioned and further features and advantages will be better understood from this description of embodiments thereof, including the attached drawing figures wherein:

FIG. 3 illustrates a schematic of a single page being scanned by a multisensor array bar to produce spatial-dependent tone reproduction curves for circumscribed areas along a page; and.

DETAILED DESCRIPTION

A high percentage of service calls on printers and copiers today are due to image quality related problems. Automated image quality diagnostic self-help tools are available that provide customers the ability to diagnose and fix problems by themselves.

Figure 1:
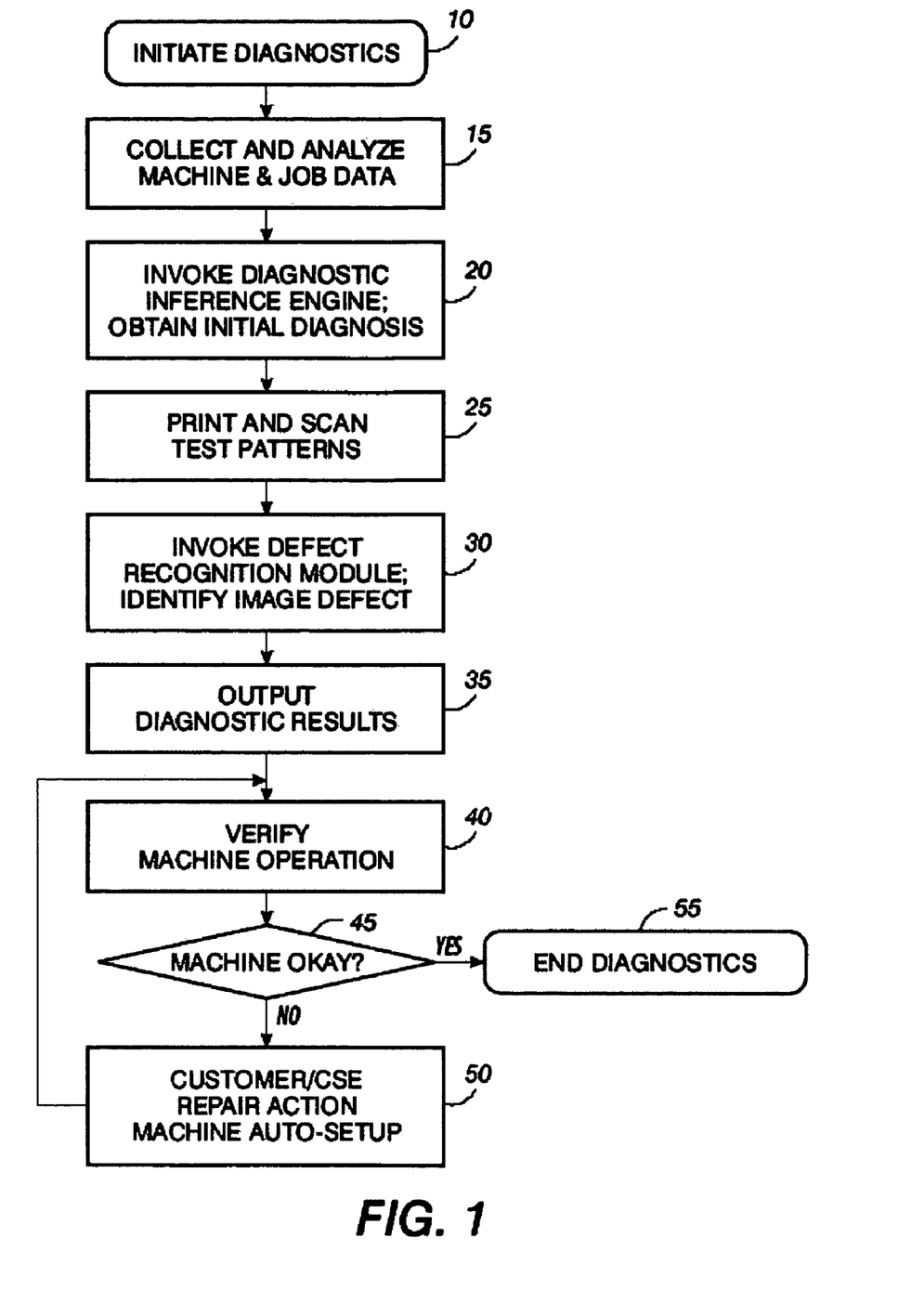
FIG. 1 shows a flow chart of an exemplar image-based quality diagnostic system.

FIG. 1 shows a typical automated image quality diagnostic system. At steps 10-20, diagnostics are initiated (step 10), the machine and job data are collected and analyzed, and a diagnostic engine is invoked to obtain the initial diagnosis or state of the machine and jobs. At step 25, a print of test pattern is made followed by scanning of the test pattern. The scan of the test patterns is analyzed by a defect recognition module, which identifies relevant image defects (step 30). The diagnostic results from the defect recognition module are outputted (step 35) to determine whether the machine's operation is within desired parameters (step 40). If the answer is in the affirmative upon inquiry as to whether the machine is properly functioning (step 45), diagnostics are exited (step 55); if the answer is in the negative, either a customer or CSE Repair Action is undertaken (step 50).

Figure 2:
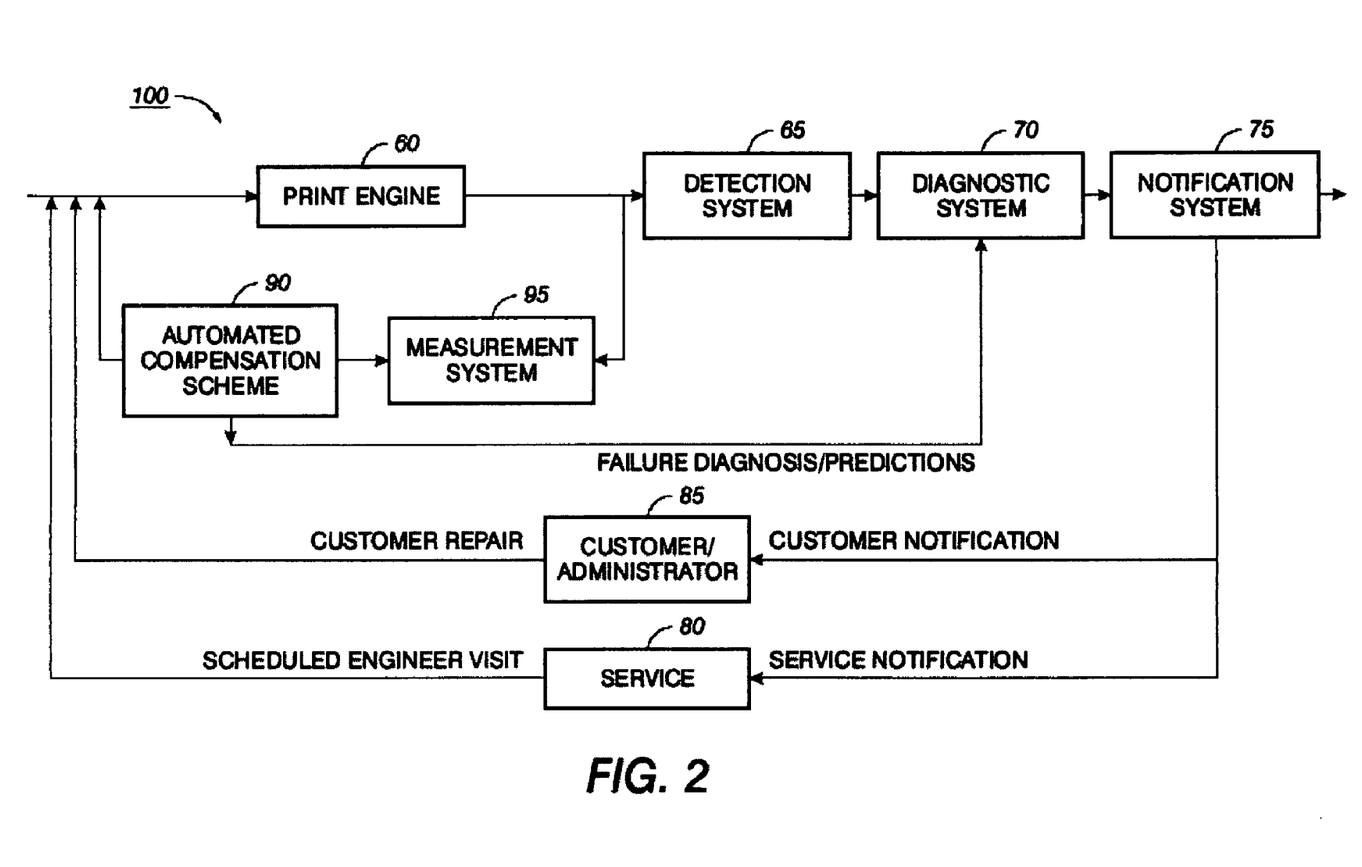
FIG. 2 illustrates a schematic of an automated image quality diagnostic system designed to provide correction to the image input into a print engine.

In an embodiment, the automated image quality diagnostic system is initiated when a degradation of image quality is detected by an image-based control system. Turning to FIG. 2, there is shown an exemplary architecture for such embodiment. Print Engine 60 provides input to output image defect Detection System 65 which may comprise, for example, sensors, a scanner or full width array. Output image defect Detection System 65 provides input to Diagnostic System 70, which is operationally configured to predict a diagnosis of the cause of such defects (the "automated image quality diagnostics system" ("AIQD") and to send input to Notification System 75, which is operationally configured to provide output to either or both the customer/administrator 85 or a service representative 80 with respect to the predicted diagnosis and/or method of correcting the defect. Such overall exemplary architecture includes an image-based control system Measurement System 95 which makes measurements (by way of, for example, sensors, a full-width array) of output image parameters (for example, the tone reproduction curves for locations along a page) and provides such information to an Automated Compensation System/Scheme 90 which maintains information pertaining to image quality of the original state of Print Engine 60 ("nominal" image quality measurement). Automated Compensation System/Scheme 90 compares image parameter measurements made by image-based control system Measurement System 95 with stored nominal values and determines any variation from nominal. Automated Compensation System/Scheme 90 then determines, for example, by way of embedded algorithms, whether the variations exceed a threshold (that is, whether they are "image defects," that are outside of desired parametric ranges) and correction is needed. Output is then provided by Automated Compensation System/Scheme 90 to Diagnostic System 70 to allow for diagnosis of the problem leading to the unacceptable variation and subsequent notification of customer/administrator 85 or service representative 80 through Notification System 75, and/or output in respect of the electronic image input into Print Engine 60 that alters the input image in a manner to improve the output image from Print Engine 60 in respect of the image defects noted.

There is in one embodiment a useful method for manipulating the input image so that the output print is devoid, or substantially devoid, of streaks. Such method entails building a look-up table based on measurements made on test pattern prints with respect to the original achievable output print quality on the print engine in regard to spatial-dependent tone reproduction curves over a page and manipulating the input image provided to the print engine to correlate with the look-up table spatial-dependent tone reproduction curves to alter the output print to be devoid of streaks. The look-up table in such defect compensation scheme stores the original state of the print engine regarding achievable print quality, that is, prior to print engine degradation and compensation. The building of the look-up tables may be done, for example, using in-line sensing techniques implemented in the print engine, for example, by way of a full-width array. The look-up tables store the spatial-dependent tone reproduction curves over a page. Such tables may be considerable in size. For example, there may be up to about 5100 spatial-dependent tone reproduction curves if a sensor of 600 DPI is used for an 8.5 inch wide page when each spatial-dependent tone reproduction curve is in the cross-process direction.

To determine a streak in such embodiment, one needs only to determine if the spatial-dependent tone reproduction curves are the same across the page of the medium, such as paper. Sensing may be by a sensor array, such as a full width array. If all the spatial-dependent tone reproduction curves are the same, then the engine is streak-free. On the other hand, if the spatial-dependent tone reproduction curves vary from one location to another, then a streak problem exists. In the quantification of the existence of the streak, one might store the coefficients of local spatial-dependent tone reproduction curves fitted by polynomial, or store the full size local spatial-dependent tone reproduction curves, or a stored compressed look-up table may store coefficients of compressed local spatial-dependent tone reproduction curves.

An example of each of these techniques is set forth below.

EXAMPLE 1

The look-up table stores the coefficients of local spatial-dependent tone reproduction curves fitted by the polynomials (e.g., second-order polynomials):

Let $T_i(g)=a_i g^2+b_i g+c_i$ represent the fitted spatial-dependent tone reproduction curves at $i^{th}$ location, where g is input gray level. The look-up table will be of size 3×5100 where 3 coefficients are stored at each of the 5100 locations. Given the $T_i(g)$ curves, the following signal s may be used as the activation signal to activate the automated image quality diagnostic scheme:

If $s=\max \sigma(T_i(g))=\max(g^2 \cdot \sigma(a_i)+g \cdot \sigma(b_i)+ \sigma(c_i))$>Streak_Threshold_$T$, then notify the automated image quality diagnostic system and start streak diagnostics where $\sigma(a_i)$ is the standard deviation of $a_i$.

The idea is to find the gray level that corresponds to the worst streak and to use the standard deviation as a measure of its "severity." Note that if more computational cost can be tolerated, then a visual transfer function that mimics the human visual system can be applied to $T_i(g)$ prior to the calculation of standard deviations. That way, the activation signal s will be even more representative of what human observers perceive. This concept of using the visual transfer function is applicable to all of the cases described below and will not be pointed out explicitly from now on.

EXAMPLE 2

The look-up table stores full-size local spatial-dependent tone reproduction curves.

Let look-up table$_i$ (g) represent the spatial-dependent tone reproduction curves at $i^{th}$ location, where g is input gray level. The look-up table will be of size 256×5100; all 256 levels of spatial-dependent tone reproduction curves are stored at all 5100 locations. First, a fixed gray level $g_0$ may be selected as the level of interest. The optimal value for $g_0$ (i.e., the optimal gray level of a test pattern used for streak diagnostics) is often available in the database of the automated image quality diagnostic system. Then, the following signal s may be used as activation signal:

If $s=\sigma$(look-up table$_i(g)$)>Streak_Threshold_$T$, then notify the automated image quality diagnostic system and start streak diagnostics.

Here, look-up table$_i(g)$ represents a virtual print inferred (or interpolated) from the look-up table as if the print engine were asked to print a uniform gray at gray level $g_0$.

EXAMPLE 3

The compressed look-up table stores coefficients of compressed local spatial-dependent tone reproduction curves (any compression scheme is applicable if the inverse is known).

Let compressed look-up table$_i$ store the coefficients of the compressed spatial-dependent tone reproduction curves at the $i^{th}$ location. The compressed look-up table will be of size N×5100 where all the coefficients are stored at all 5100 locations. The value N depends on what compression scheme is used. The principal component analysis compression scheme may be used, and N equals 3. First, one may decompress the compressed look-up table$_i$ back to look-up table$_i$ (g) by reversing the compression scheme, where g is input gray level. In the case of principal component analysis compression, this means reconstructing the look-up table using the coefficients stored in compressed look-up table$_i$ and the principal component analysis bases. The look-up table will now be of size 256×5100 where all levels of spatial-dependent tone reproduction curves are stored at all 5100 locations. Similar to Example 2, an initial fixed gray level $g_0$ may be selected as the level of interest. Then, the following signal s may be used as activation signal:

If $s=\sigma$(look-up table$_i(g)$)>Streak_Threshold_$T$, then notify the automated image quality diagnostic system and start streak diagnostics.

Alternatively, a more direct approach can be used to find look-up table$_i$ ($g_0$) without reversing the entire compressed look-up table at all gray levels g. This implementation would be compression-scheme dependent.

Alternatively, the look-up table value at gray level $g_0$ may be determined via interpolation or look-up of the given look-up table. The activation signal s may be calculated and tested as in Example 2. That is, such scheme may be implemented by looking up the correction table, calculating one or a few standard deviation(s), and a threshold comparison.

It should be understood that the above examples, and the algorithms included therein, are used to illustrate the concept using an exemplar image-based control system. As would be understood, the concept is equally applicable to other image-based control systems as well. One need only to determine what the actuator in the given image-based control system is, and then determine a signal that may be extracted from the actuator for diagnostic purposes and compensation of the input image into the print engine.

Such embodiments may permit a standard look-up table to be generated from input from the image-based control system which is stored and later used to determine any degradation in the image system rather than generating an extemporaneous control test pattern and from this, producing an ad hoc look-up table to determine if there is an image degradation problem.

In one embodiment, there is disclosed a method for determining and ameliorating anomalies on an output image of a printer printing tangible output images from an electronic input image comprising determining the gray levels that correspond to one or more anomalies on a printer output image; determining the spatial variation of the gray levels that correspond to one or more anomalies; determining an activation signal based on such spatial variations for activating a diagnostic with respect to one or more anomalies; and causing a diagnostic module to be activated if the activation signal is greater than a predetermined threshold activation signal. In such method embodiment, the diagnostic module may be configured to alter the electronic input image of the printer when the diagnostic module is activated, and/or to provide notification of a suspected anomaly and potential remedies for the anomaly. The spatial variation of the grey levels may relate to the tone reproduction curves along the tangible output image. The spatial variation of gray levels may be determined by a sensor array, for example, by a full width array.

Figure 3:
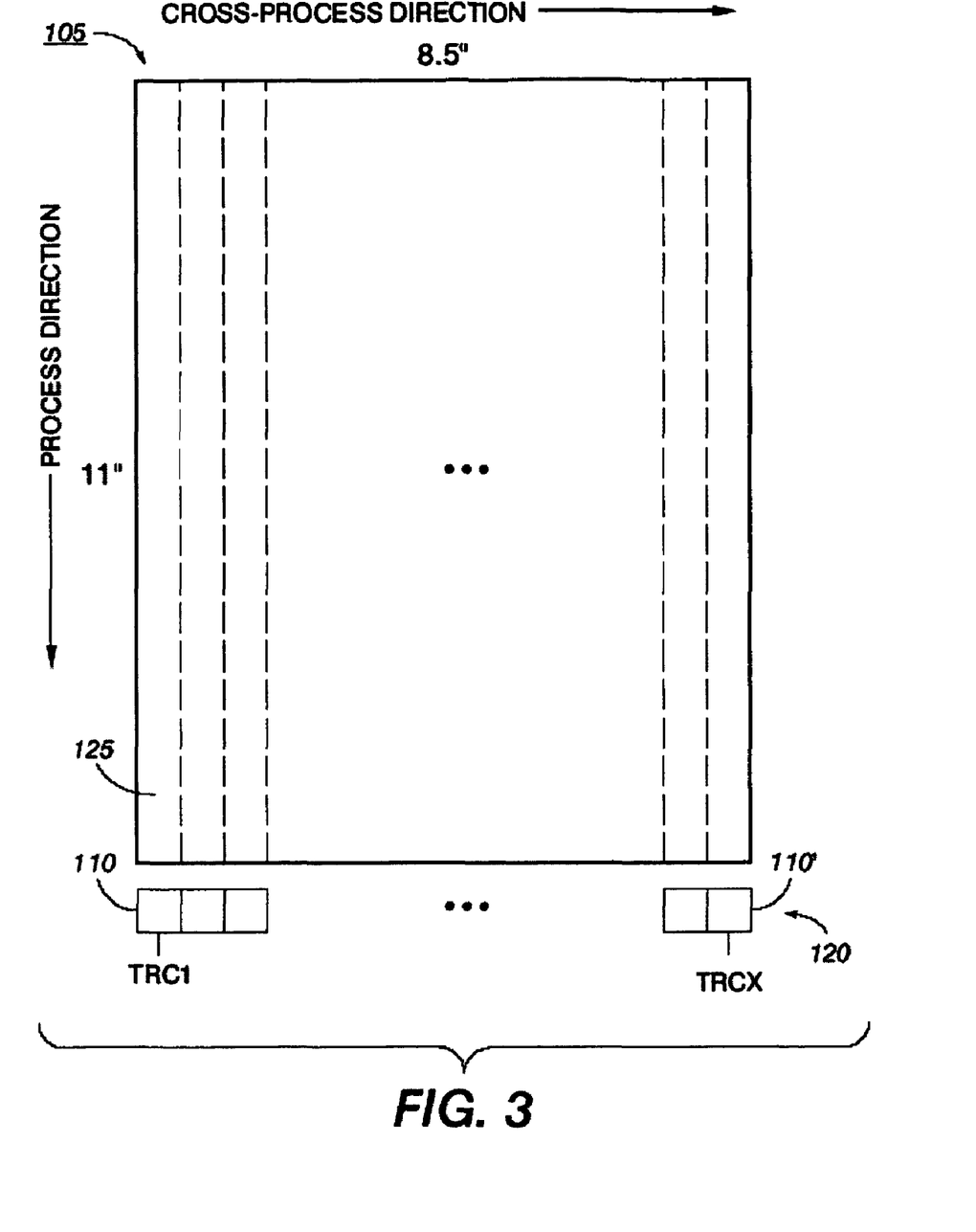

Now turning to FIG. 3, there is shown a schematic of a single page being scanned by a multisensor array bar 120 comprising a plurality of sensors, 110, 110" of 600 DPI used to detect spatial-dependent tone reproduction curves over the page 105 at discrete uniform areas 125 over the page 105. For an 8.5 inch size page, about 5100 spatial-dependent tone reproduction curves may be generated using a conventional full width array. By comparing a stored look-up table of the nominal spatial-dependent tone reproduction curves of the incipient system (that is, before print image degradation) with the spatial-dependent tone reproduction curves generated extemporaneously, one can determine if the print engine is producing streaked output images (that is, if the tone reproduction curves are the same, the engine is streak-free, while if the extemporaneous tone production curves vary from those stored from one location to another, a streak problem exists). Correction of any problem noted may occur when the measured values are outside of a predetermined level of acceptable variation. Correction may include algorithmic induced changes to the image input into the print engine and/or relaying a diagnosis and treatment regimen to, for example, a customer, administrator or service representative.

While the invention has been particularly shown and described with reference to particular embodiments, it will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An automated image-quality diagnostic system in a printing system comprising:
    a printing engine configured to intake electronic image input and to output tangible image output based on said electronic image input;
    an image-based measurement system configured to make measurements of image parameters associated with said tangible image output;
    an automated compensation system configured to: (a) store nominal value parametric measurements for one or more image parameters measured by said image-based measurement system, (b) compare said nominal value measurements to related one or more parameters measured to determine one or more anomalies in said output tangible image system, and (c) provide a feedback signal, based on the comparison, to the printing engine to alter gray levels of said electronic image input into said printing engine, prior to printing, which are used to correct said determined anomalies in a subsequent tangible image output from said printing engine; and
    an automated diagnostic system configured to diagnose the tangible image output of the altered input image of said electronic image input and to predict a cause of the one or more anomalies in the printing system which are not corrected by altering gray levels of said electronic image input into said printing engine,
    wherein the diagnostic system is activated by a feedforward signal from the automated compensation system if a spatial variation of the tangible image output of the altered gray levels of said electronic image input that correspond to the one or more anomalies is greater than a predetermined threshold activation signal.

2. The system in accordance with claim 1 wherein said anomalies are selected from the group consisting of one or more of periodic, one-dimensional bands; one- or two-dimensional periodic variations; isolated (non-periodic) one-dimensional streaks; irregular two-dimensional variations from noise; frequency modulated half tone patterns; and amplitude modulated cluster dot half tone patterns.

3. The system in accordance with claim 1 wherein said anomalies are a periodic one-dimensional band.

4. The system in accordance with claim 1 wherein said anomalies are one or more streaks.

5. The system in accordance with claim 1 wherein said related one or more parameters are commensurate in measure to said nominal value parameters.

6. The system in accordance with claim 1 wherein said related one or more parameters are mathematically correlatable with said nominal value parameters.

7. The system in accordance with claim 1 wherein said output tangible image is on print on a medium.

8. The system in accordance with claim 7 wherein said medium is a sheet of paper.

9. The system in accordance with claim 1 wherein said parameter measured by said image-based measurement system is the spatial-dependent tone reproduction curves over the tangible image output.

10. The system in accordance with claim 1 wherein said image-based measurement system comprises a sensor array.

11. A method for determining and correcting anomalies on an output image of a printer printing tangible output image from an electronic input image comprising:
    determining gray levels in the electronic image input provided to a printing engine that correspond to one or more anomalies of a printer output image;
    providing a feedback signal, based on the determined gray levels, to alter gray levels of said electronic image input into said printing engine, prior to printing, which are used to correct said determined anomalies in a subsequent tangible image output from said printing engine;
    determining spatial variation of the tangible image output of the altered gray levels of said electronic image input that correspond to said one or more anomalies, wherein said spatial variation is capable of being perceptually weighted via a visual transfer function; and
    determining a feedforward activation signal, based on said spatial variations, to activate a diagnostic in the printer with respect to said one or more anomalies; and
    causing an automated diagnostic module to be activated to diagnose the tangible image output of the altered grey levels of said electronic image input and to predict a cause of the one or more anomalies in the printing system which are not corrected by altering gray levels of said electronic image input into said printing engine if said activation signal is greater than a predetermined threshold activation signal.

12. The method in accordance with claim 11 wherein said diagnostic module is configured to provide notification of a suspected anomaly and potential remedies for the anomaly.

13. The method in accordance with claim 11 wherein said spatial variation of the gray levels relates to the tone reproduction curves along said tangible output image.

14. The method in accordance with claim 11 wherein said anomaly is selected from the group consisting of one or more of periodic, one-dimensional bands; one- or two-dimensional periodic variations; isolated (non-periodic) one-dimensional streaks; irregular two-dimensional variations from noise; frequency modulated half tone patterns; and amplitude modulated cluster dot half tone patterns.

15. The method in accordance with claim 11 wherein said spatial variation of the gray levels is determined by a measurement system comprising a sensor array.

16. The method in accordance with claim 15 wherein said sensor array is a full width array.

17. An automated image quality diagnostic system configured to obtain a feedback signal from an image-based control system in communication with a print engine designed to print a tangible output image in response to an input image inputted into the print engine, and to alter the output image of said print engine based on said feedback signal from said image-based control system by altering the input image of said print engine, prior to printing, which are used to correct anomalies in a subsequent tangible image output from said print engine, the system comprising:

an automated diagnostic system configured to diagnose the tangible image output of the altered input image of said electronic image input and to predict a cause of one or more anomalies in the printing system which are not corrected by altering gray levels of said electronic image input into said print engine, wherein the diagnostic system is activated by a feedforward signal from the automated compensation system if a spatial variation of the tangible image output of gray levels of the altered image data that correspond to the one or more anomalies is greater than a predetermined threshold activation signal.

18. The system in accordance with claim 17 wherein said print engine is a xerographic printer.

19. The method according to claim 11, wherein determing the activation signal comprises:

calulating the maximum standard deviation of a function charaterizing the spatial variations of the gray levels; and comparing the calculation with a predetermined threshold.

20. The method according to claim 11, wherein determing the activation signal comprises:

calculating the standard deviations of the spatial variations of the gray levels; and comparing the calculation with a predetermined threshold.

21. The method according to claim 11, further comprising:
APPLYING A VISUAL TRANSFER FUNCTION TO THE SPATIAL VARIATIONS THAT MIMICS HUMAN VISUAL PERCEPTION.

22. The method according to claim 11, further comprising:
determining a signal of an actuator of the printer to be extracted for diagnostic and compensation of the input image into the printer.

23. The method according to claim 11, further comprising:
generating a look up table from the input image; and
using the lookup table to determine any degradation in the printer without printing any test pattern.

* * * * *